(12) United States Patent
Tange

(10) Patent No.: US 12,719,357 B2
(45) Date of Patent: Aug. 25, 2026

(54) ISOLATED GATE DRIVER SYSTEM HAVING ISOLATION FOR BOTH POWER TRANSMISSION AND SIGNAL TRANSMISSION INTEGRATED INTO ONE MODULE

(71) Applicant: Murata Manufacturing Co., Ltd., Nagaokakyo (JP)

(72) Inventor: Takayuki Tange, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 173 days.

(21) Appl. No.: 18/758,175

(22) Filed: Jun. 28, 2024

(65) Prior Publication Data

US 2025/0007394 A1 Jan. 2, 2025

(30) Foreign Application Priority Data

Jun. 28, 2023 (GB) ..................................... 2309763

(51) Int. Cl.
*H02M 3/00* (2006.01)
*H02M 1/08* (2006.01)
*H02M 3/335* (2006.01)

(52) U.S. Cl.
CPC ............... *H02M 3/01* (2021.05); *H02M 1/08* (2013.01); *H02M 3/33569* (2013.01)

(58) Field of Classification Search
CPC ....... H02M 1/08; H02M 3/01; H02M 3/33569
See application file for complete search history.

(56) References Cited

U.S. PATENT DOCUMENTS 10,917,017 B1 * 2/2021 McFarland ......... H02M 3/3376
10,931,204 B1 2/2021 Han et al.
2019/0267985 A1 8/2019 Li et al.
2019/0386517 A1 * 12/2019 Liu ..................... H02M 3/3376
2020/0099376 A1 3/2020 Rinne et al.
2022/0116036 A1 4/2022 Rinne et al.
2023/0412001 A1 * 12/2023 Kim .................. H02M 3/33573
2024/0171010 A1 * 5/2024 Luo ......................... H02J 50/12

FOREIGN PATENT DOCUMENTS

CN 113890363 A 1/2022
CN 115102300 A 9/2022
WO 2014135209 A1 9/2014
WO 2016032981 A1 3/2016

OTHER PUBLICATIONS

Official Communication issued in corresponding United Kingdom Patent Application No. GB2309763.7, mailed on Dec. 21, 2023.

* cited by examiner

*Primary Examiner* — Lakaisha Jackson
(74) *Attorney, Agent, or Firm* — Keating & Bennett, LLP

(57) ABSTRACT

In an isolated gate driver system, isolation for both power transmission and signal transmission is integrated into a single module. The isolated gate driver system includes a resonant isolated DC-DC converter, and uses a modulation scheme to transfer a control signal in combination with power supply through a transformer of the resonant isolated DC-DC converter. A resonance tank control switch modifies a capacitance in a resonance tank circuit based on a signal indicative of the control signal.

20 Claims, 9 Drawing Sheets

ISOLATED GATE DRIVER SYSTEM HAVING ISOLATION FOR BOTH POWER TRANSMISSION AND SIGNAL TRANSMISSION INTEGRATED INTO ONE MODULE

CROSS REFERENCE TO RELATED APPLICATIONS

This application claims the benefit of priority to United Kingdom Patent Application No. 2309763.7 filed on Jun. 28, 2023. The entire contents of this application are hereby incorporated herein by reference.

BACKGROUND OF THE INVENTION

1. Field of the Invention

This application relates to isolated gate driver systems, and gate driver systems where isolation for both power transmission and signal transmission is integrated into one module.

2. Description of the Related Art

Gate driver systems are used to output a driving signal to a gate terminal of a device, based on a control signal. The device is typically a power switch, such as an insulated-gate bipolar transistor (IGBT), a silicon carbide MOSFET (SIC), a standard silicon MOSFET (MOS), a Gallium Nitride (GaN) transistor, or the like. Technical fields with power switch gate drive applications, such as motor drives, inverters, uninterruptible power sources (UPS), solar power devices, electric vehicles and so on, require accurate input voltages at the gate of the power switch, provided by the gate driver system.

The control signal alone is not sufficient to drive the gate of the power switch, and therefore a power supply is also needed for gate driver systems. In an isolated gate driver system, the control signal and the power supply must both be isolated.

FIG. 1 shows one example of an isolated gate driver system 100 of the prior art. The gate driver system 100 outputs a signal to the gate terminal of a device 102. In FIG. 1, PS stands for power supply, HS stands for high side, LS stands for low side, PWM stands for pulse-width modulation and RTD stands for Resistance Temperature Detector. A power supply $V_{IN}$ is also provided.

In order to preserve isolation for the control signal in the exemplary gate driver system 100, an isolated gate driver 104 is used for sending the gate (control) signal. In order to preserve isolation for the power, an isolated DC-DC converter 106 is used for transmitting the electrical power from $V_{IN}$. Due to the need for two separate isolated components (the isolated gate driver 104 and the isolated DC-DC converter 106), known gate driver systems such as the gate driver system 100 of FIG. 1 have a tendency to be large. Specifically, if the power and signal each need to be separately transferred by an isolation module, this requires two separate spaces on a circuit board.

Thus, it would be desirable to provide an isolated gate driver system where isolation for both power transmission and signal transmission is integrated into one module.

SUMMARY OF THE INVENTION

Example embodiments of the present invention provide isolated gate driver systems to overcome one or more of the problems described above.

According to an example embodiment of the present invention, an isolated gate driver system includes an isolated DC-DC converter including a primary side and a secondary side, wherein the primary side includes an input to receive a supply voltage, a switch controller, first and second switches, and a resonance tank circuit including one or more capacitors and a first inductor, and the secondary side includes a second inductor coupled to the first inductor to define a transformer, and an output interface to output a bipolar voltage, a modulator to receive a control signal, generate a modulated signal based on the control signal, and output the modulated signal to the switch controller to control switching of the first and second switches in the primary side of the isolated DC-DC converter, a resonance tank control switch to receive a signal indicative of the control signal from the modulator and modify a capacitance in the resonance tank circuit based on the signal indicative of the control signal, a demodulator to receive a signal induced in the secondary side of the isolated DC-DC converter, demodulate the signal to recover the control signal, and output the demodulated control signal, and a gate driver circuit to receive the demodulated control signal from the demodulator and receive the bipolar voltage output by the isolated DC-DC converter and to output a driving signal for a transistor based on the demodulated control signal and the bipolar voltage.

Optionally, the control signal may be a pulse-width modulation (PWM) signal or a pulse-frequency modulation (PFM) signal.

Optionally, the modulated signal may have a first frequency corresponding to an OFF state of the control signal, and may have a second frequency corresponding to an ON state of the control signal. Optionally, the modulator may generate the modulated signal using frequency-shift keying (FSK). Optionally, either the signal indicative of the control signal may be the modulated signal, or, the signal indicative of the control signal may be the control signal itself.

Alternatively, the modulator may include an edge detector to detect a change between an ON state and an OFF state in the control signal, and the modulated signal may have a first frequency corresponding to when an edge is not detected, and may have a second frequency corresponding to when edge is detected. Optionally, the edge detector may output an edge signal indicating when an edge is detected and when an edge is not detected, and the signal indicative of the control signal may be the edge signal. Alternatively, the signal indicative of the control signal may be the modulated signal, or the signal indicative of the control signal may be the control signal itself.

Optionally, the resonance tank control switch may set the capacitance in the resonance tank circuit to a first capacitance value when the modulated signal has the first frequency, and the resonance tank control switch may set the capacitance in the resonance tank circuit to a second capacitance value when the modulated signal has the second frequency.

Optionally, a resonance frequency of the resonance tank circuit with the first capacitance value may be equal to the first frequency, and a resonance frequency of the resonance tank circuit with the second capacitance value may be equal to the second frequency.

Optionally, the modulated signal may have a duty cycle equal to about 50%.

Optionally, the resonant tank circuit may include a first capacitor coupled to the first inductor, and the resonance tank control switch may be configured to modify the capacitance in the resonance tank circuit by connecting a second capacitor in parallel to the first capacitor.

Alternatively, the resonance tank circuit may include a first capacitor and a second capacitor, and the resonance tank control switch may be configured to modify the capacitance in the resonance tank circuit by selectively switching between the first capacitor and the second capacitor.

Optionally, the demodulator may be coupled to the second inductor to receive the signal induced in the secondary side.

Optionally, the first and second switches may be arranged as a half bridge.

Optionally, the isolated DC-DC converter may be a resonant half-bridge converter.

Optionally, the isolated gate driver system may further include a first stage DC-DC converter to receive an input voltage, generate an output voltage from the input voltage, and output the output voltage as the supply voltage for the isolated DC-DC converter.

Optionally, the first stage DC-DC converter may be a non-isolated DC-DC converter, preferably a buck converter.

Optionally, the output interface may include a rectifier circuit coupled to the second inductor.

Optionally, the rectifier circuit may be a voltage doubler.

Optionally, the output interface may include a filter circuit to smooth the output voltage of the rectifier circuit.

Optionally, the output interface may include a voltage dividing circuit to convert the output voltage of the rectifier circuit into the bipolar voltage.

Optionally, the transistor may be any one of a MOSFET, an IGBT, a SiC MOSFET, or a GaN HEMT.

Optionally, the transformer including the first and second inductor may provide isolation for both the supply voltage and the control signal.

According to another example embodiment of the present invention, a method of generating a driving signal for a transistor includes inputting a supply voltage into a primary side of an isolated DC-DC converter, wherein the primary side includes a switch controller, first and second switches, and a resonance tank circuit including one or more capacitors and a first inductor, the first inductor is coupled to a second inductor on a secondary side of the isolated DC-DC converter to define a transformer, generating, by a modulator, a modulated signal based on a received control signal and outputting the modulated signal to the switch controller to control switching of the first and second switches in the primary side of the isolated DC-DC converter, sending, from the modulator to a resonance tank control switch, a signal indicative of the control signal, modifying, by the resonance tank control switch, a capacitance in the resonance tank circuit based on the signal indicative of the control signal, receiving, by a demodulator, a signal induced in the secondary side of the isolated DC-DC converter, demodulating the signal received by the demodulator to recover the control signal, receiving, by a gate driver circuit, the demodulated control signal from the demodulator, outputting, by the gate driver circuit, a driving signal for a transistor based on the demodulated control signal from the demodulator and a bipolar voltage output by an output interface of the secondary side of the isolated DC-DC converter.

In an example embodiment of the present invention, the isolation for both the power and signal are integrated into one module, i.e., isolation is provided by the same transformer. In an example embodiment of the present invention, isolation for both the power and signal is provided by the transformer including the coupled first and second inductors.

Because the isolation is integrated into one single module, the circuit can be miniaturized, with less components needed.

Further, the switching of the capacitance in the resonance tank circuit according to an example embodiment of the present invention may advantageously dynamically shift the resonance point of the tank circuit to match the frequency of the modulated signal, thus preventing any insufficiency of the power supply to transistor.

Example embodiments of the present invention also advantageously provide good load regulation due to the resonance topology, and achieve a particularly high efficiency when edge detection modulation is used.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described in relation to the accompanying drawings.

DETAILED DESCRIPTION OF THE EXAMPLE EMBODIMENTS

This application relates to an isolated gate driver system where isolation for both power transmission and signal transmission is integrated into a single module. The isolated gate driver system includes a resonant isolated DC-DC converter, and uses a modulation scheme to transfer a control signal in combination with power supply through the transformer of the isolated DC-DC converter. A resonance tank control switch modifies a capacitance in the resonance tank circuit based on a signal indicative of the control signal.

Figure 2:
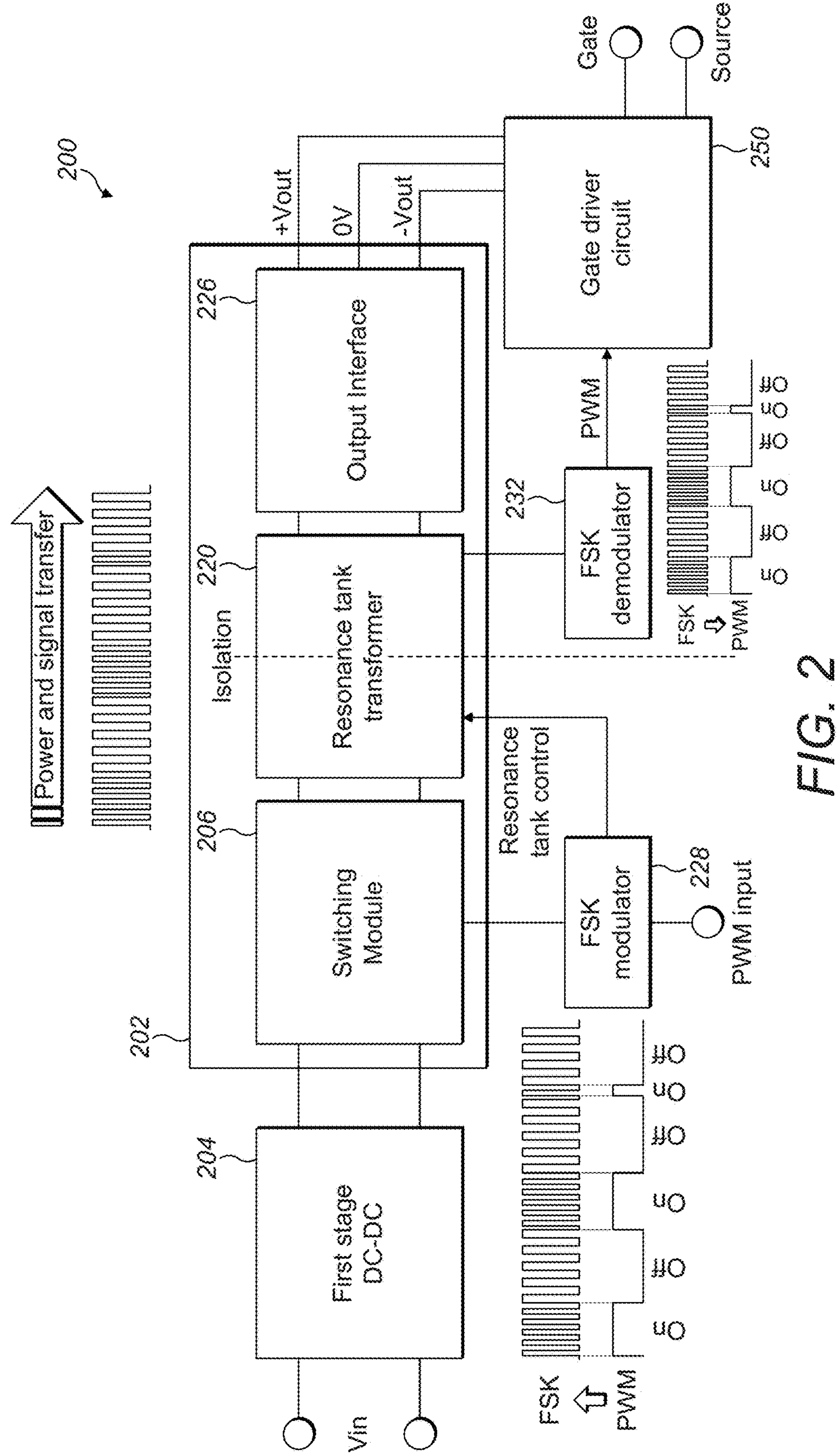
FIG. 2 shows an isolated gate driver system according to a first example embodiment of the present invention.
Figure 3:
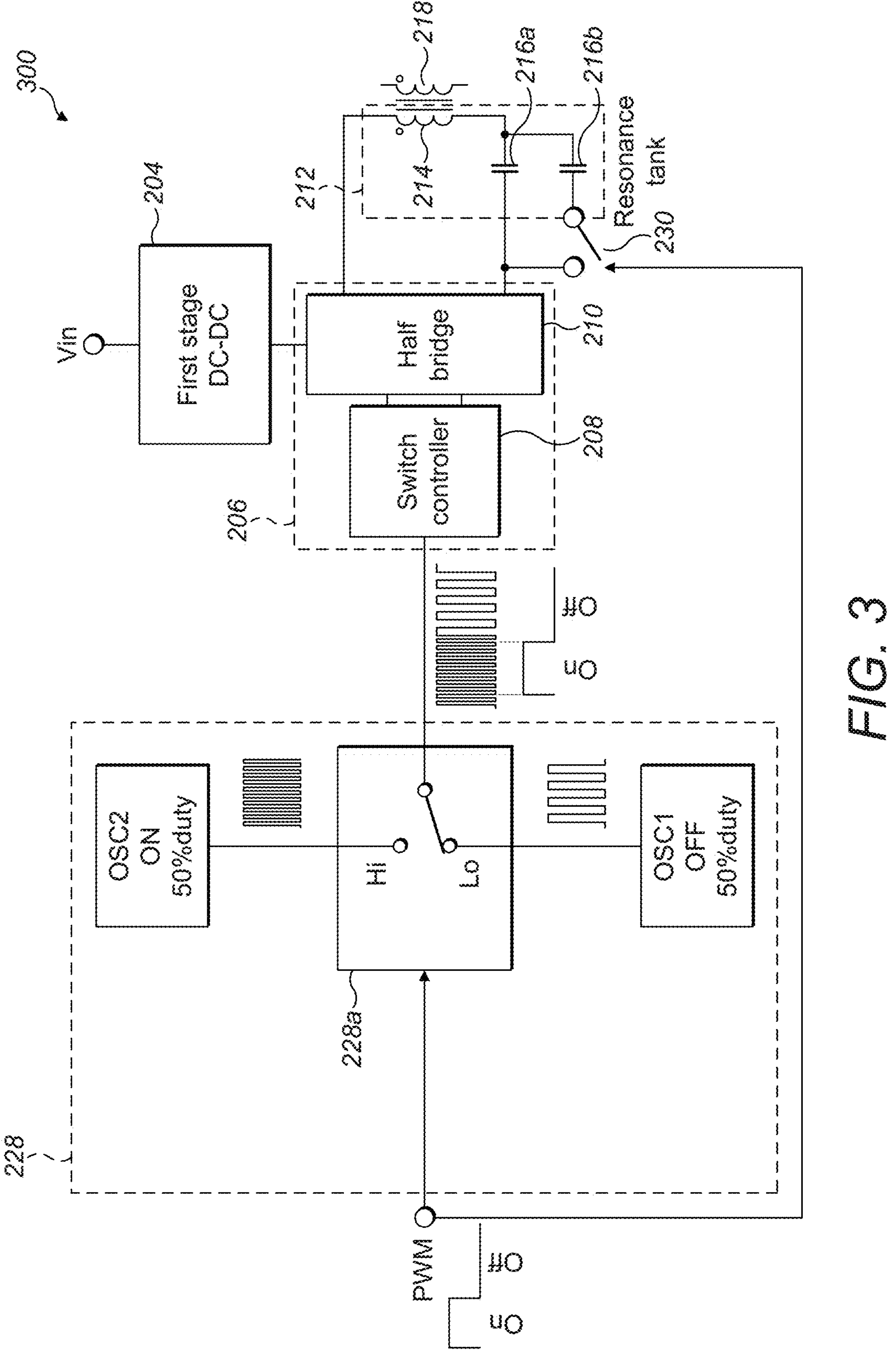
FIG. 3 shows a configuration of a primary side of the isolated gate driver system according to FIG. 2.
Figure 4:
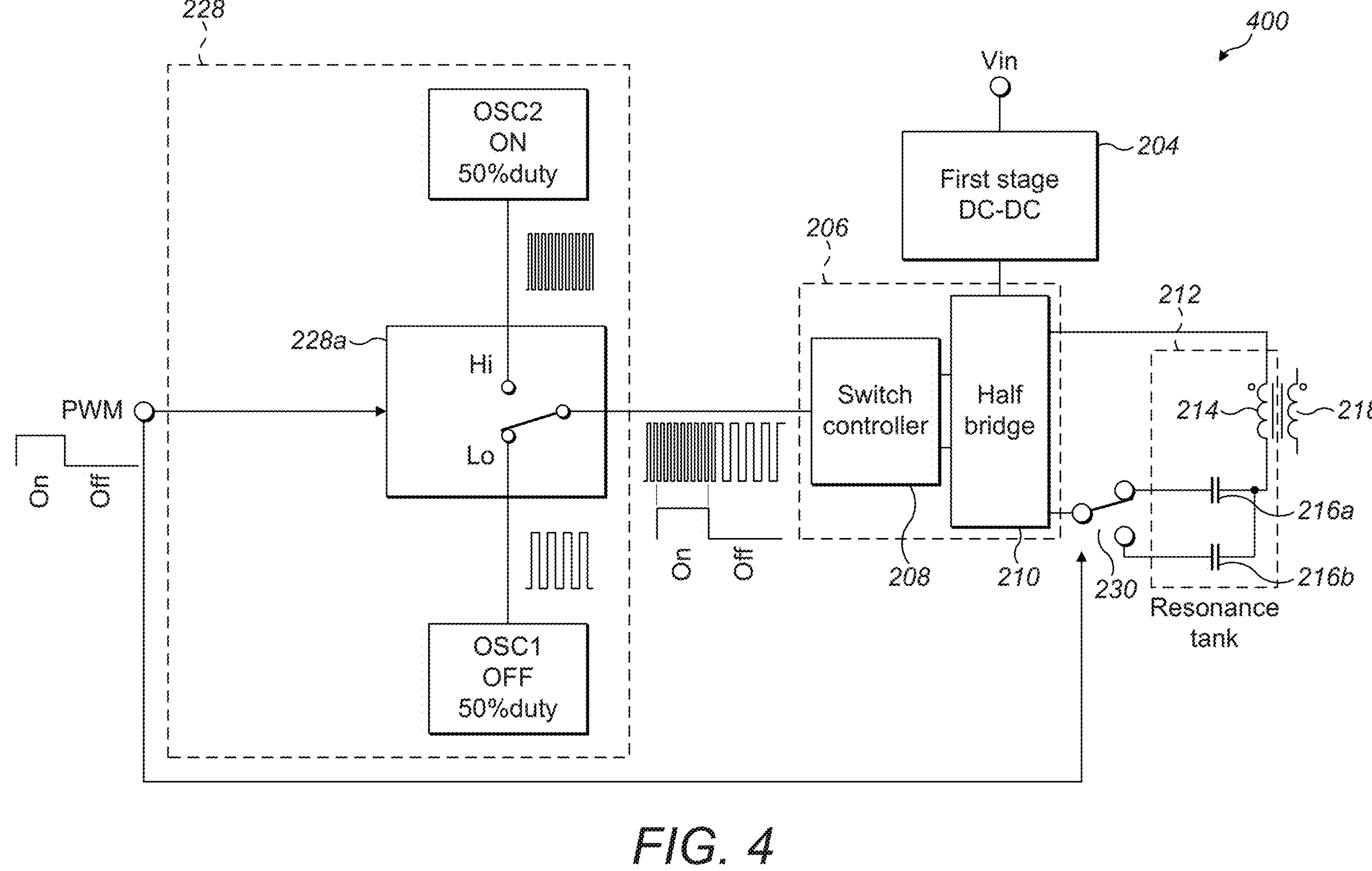
FIG. 4 shows an alternative configuration of a primary side of the isolated gate driver system according to FIG. 2.
Figure 5:
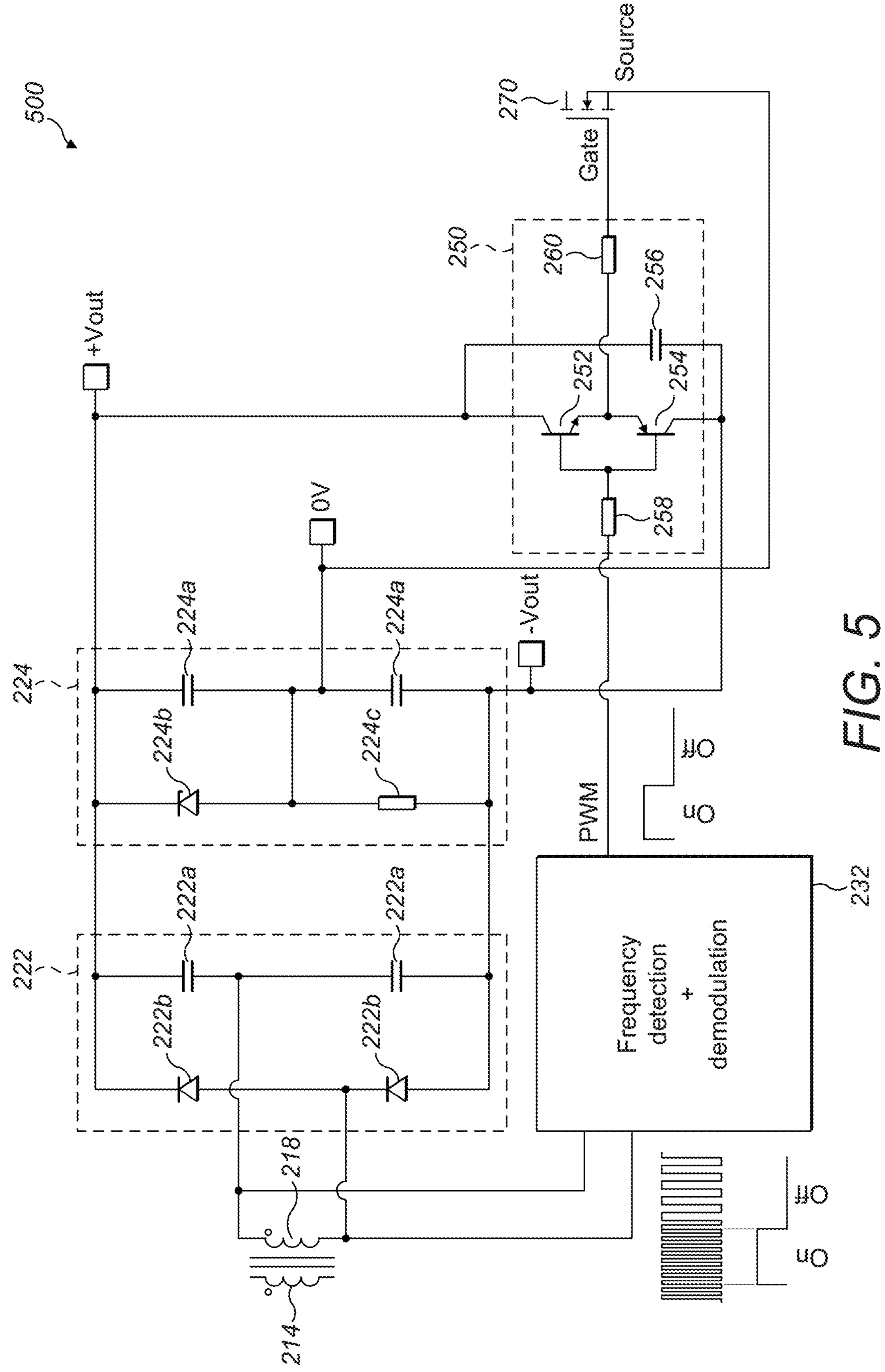
FIG. 5 shows a configuration of a secondary side of the isolated gate driver system according to FIG. 2.

FIG. 2 shows an isolated gate driver system 200 according to a first example embodiment of the present invention. The isolated gate driver system includes an isolated DC-DC converter 202 including a primary side and a secondary side. FIGS. 3 and 4 show different alternatives of a primary side 300,400 of the isolated gate driver system according to FIG. 2, including the primary side of the isolated DC-DC converter 202. FIG. 5 shows a configuration of a secondary side 500 of the isolated gate driver system according to FIG. 2, including the secondary side of the isolated DC-DC converter 202.

The primary side of the isolated DC-DC converter 202 includes an input to receive a supply voltage. Optionally, the isolated gate driver system 200 may include a first stage DC-DC converter 204 to provide the supply voltage, as shown in the example embodiment of FIG. 2. The first stage DC-DC converter 204 may be a non-isolated DC-DC converter, such as a buck converter or the like, that receives a first voltage Vin and converts this to the supply voltage before outputting the supply voltage to the isolated DC-DC converter 202. In other example embodiments, the first stage DC-DC converter 204 may be omitted, and various other types of DC power supplies may be used to provide the supply voltage, such as a battery, an AC-DC converter, or the like.

The primary side of the isolated DC-DC converter 202 further includes a switching module 206 including a switch controller 208 and first and second switches. In the present example embodiment, the first and second switches are arranged as a half bridge 210 in the switching module, however, various other known DC-DC converter topologies may be used. The switching module 206 receives the supply voltage, and outputs an alternating signal using this supply voltage based on the switching of the first and second switches controlled by the switch controller 208. The alternating signal is output to a resonance tank circuit 212 (LC circuit) in the primary side, including a first inductor 214 and first and second capacitors 216*a*, 216*b*, as shown in FIGS. 3 and 4 and discussed in further detail later.

The secondary side 500 of the isolated DC-DC converter 202 includes a second inductor 218. The second inductor 218 is coupled to the first inductor 214 in the resonance tank circuit 212 of the primary side 300, 400 to define a transformer 220. The alternating signal in the resonance tank circuit 212 causes the first inductor 214 to induce an alternating signal in the second inductor 218 in the secondary side 500. The induced alternating signal in the second inductor 218 is passes to a rectifier circuit 222, which converts the induced alternating signal into a DC voltage. The isolated DC-DC converter 202 of the first example embodiment is therefore a resonant half-bridge converter. However, as mentioned, other resonant isolated DC-DC converter topologies may be used.

FIG. 5 shows one example of the internal circuitry of the rectifier circuit 222. The rectifier circuit 222 of FIG. 5 is a voltage doubler circuit including a pair of capacitors 222*a* in parallel with a pair of diodes 222*b*, with the second inductor 218 connected between the midpoint of the pair of diodes and the midpoint of the pair of capacitors. As would be understood by the skilled person, various alternative rectifier circuits may be used, and the present invention is not limited to the specific arrangement shown in FIG. 5. For example, the rectifier circuit 222 may be any of a voltage multiplier circuit, such as a quadrupler circuit, or a full wave rectifier, such as a two diode centre-tapped full wave rectifier, a full wave bridge rectifier, or the like. The rectifier circuit 222 may also include a filter circuit in some example embodiments (not shown in FIG. 5), to smooth the output voltage of the rectifier circuit. For example, the rectifier circuit 222 may include a series inductor filter, shunt capacitor filter, or an LC Filter, or the like.

The secondary side 500 of the isolated DC-DC converter 202 further includes a voltage dividing circuit 224 that receives the DC voltage output from the rectifier circuit 222 and converts this voltage to a bipolar voltage +Vout, −Vout. FIG. 5 also shows one example of the internal circuitry of the voltage dividing circuit 224, including a pair of capacitors 224*a* connected between the output of the rectifier circuit 222, and a diode 224*b* and resistor 224*c* connected in series between the output of the rectifier circuit 222, with the mid point of the pair of capacitors and the midpoint of the diode and resistor both connected to ground (0V). Again, various alternative voltage dividing circuits may be used, as would be understood by the skilled person, and the present invention is not limited to the specific arrangement shown in FIG. 5.

The rectifier circuit 222 and voltage dividing circuit 224 together define an output interface 226 to receive the induced alternating signal from second inductor 218 and outputs a bipolar DC voltage. As will be appreciated, various circuit arrangements can be used to perform the function of the output interface 226, and the present invention is not limited to the circuit arrangements shown in the present example embodiments. The bipolar voltage generated by the output interface 226 is output to a gate driver circuit 250, as will be discussed in more detail below.

The isolated gate driver system 200 further includes a modulator 228 in the primary side 300, 400. The modulator 228 receives a control signal. In the example embodiment shown in FIGS. 2 to 5, the control signal is a pulse-width modulation (PWM) signal. However, in other example embodiments, other pulsed or logical control signals may be used, such as a pulse-frequency modulation (PFM) signal. The control signal specifies the switching pattern for a transistor (power switch 270) to be driven by the isolated gate driver system 200.

The modulator 228 generates a modulated version of the control signal. Various modulation schemes may be used. In the first example embodiment of FIGS. 2 to 5, a frequency-shift keying (FSK) modulation scheme is used. Specifically, the modulator 228 converts each OFF state of the control signal to a square wave carrier signal with a first frequency and an approximately 50% duty cycle. Further, the modulator 228 converts each ON state of the control signal to a square wave carrier signal with a second frequency and an approximately 50% duty cycle, with the second frequency being different to the first frequency. In the present example embodiment, the second frequency is higher than the first frequency, however the second frequency may also be lower than the first frequency in some example embodiments.

As shown in FIGS. 3 and 4, the modulated signal may be generated by using a switch 228*a* in the modulator 228 that switches between the carrier signal with the first frequency (OSC1) during the OFF state of the control signal, and the carrier signal with the second frequency (OSC2) during the ON state of the control signal.

The modulated signal (FSK signal) generated by the modulator 228 based on the control signal is output to the switch controller 208, to control switching of the first and second switches in the switching module 206 in the primary side of the isolated DC-DC converter 202. The signal in the resonance tank circuit 212 and first indicator 214 therefore alternates at different frequencies during the ON and OFF states of the control signal. The changing switching frequency of the switching module 206, due to the changing frequency of the modulated signal, encodes the control signal being transferred to the power switch 270. The first inductor 214 induces the alternating signal in the second inductor 218, through the transformer 220, thus providing isolation for the encoded control signal at the same time as transferring the supply voltage through the isolated DC-Dc converter 202.

Additionally, the modulator 228 sends a signal indicative of the control signal to a resonance tank control switch 230 in the primary side. The signal indicative of the control signal may be any signal that enables the ON or OFF state of the control signal to be determined. For example, this may be either the modulated signal or the control signal itself in some example embodiments. The resonance tank control switch 230 modifies the capacitance in the resonance tank circuit 212 (LC circuit) based on the signal indicative of the control signal, as will be discussed in more detail below.

FIGS. 3 and 4 show two different alternatives for the arrangement of the resonance tank control switch 230. Looking first at FIG. 3, the resonance tank circuit 212 includes 10 first capacitor 216*a* connected in series with the first inductor 214, to define the resonance tank. The first capacitor 216*a* is connected with the first inductor regardless of the ON or OFF state of the control signal. The resonance tank circuit 212 of FIG. 3 also includes a second capacitor 216*b* which is selectively connected in parallel with the first capacitor 216*a* via the resonance tank control switch 230, based on the ON or OFF state of the control signal indicated by the signal indicative of the control signal.

Specifically, in the present example embodiment, when the signal indicative of the control signal indicates that the control signal is in an OFF state, the resonance tank control switch 230 turns on to connect the second capacitor 216*b* in parallel with the first capacitance 216*a*. This increases the total (effective) capacitance in the resonance tank circuit 212 when the control signal is in an OFF state, and hence when the frequency of the modulated signal is the first (lower) frequency.

Similarly, when the signal indicative of the control signal indicates that the control signal is in an ON state, the resonance tank control switch 230 turns off to disconnect the second capacitor 216*b*. Thus, the total (effective) capacitance when the control signal is in an ON state, and hence the frequency of the modulated signal is the second (higher) frequency, is equal to the capacitance of the first capacitor 216*a*. In this way, the capacitance of the resonance tank circuit 212 is modified when the control signal changes, such that the ON and OFF states of the control signal (and hence the first and second frequencies of the modulated signal) each have their own respective resonant tank configuration. Specifically, the capacitance of the resonance tank circuit 212 is reduced when the control signal is in an ON state (and the frequency of the modulated signal is higher).

FIG. 4 shows an alternative arrangement, where the resonance tank control switch 230 instead selectively connects either the first capacitor 216*a* or the second capacitor 216*b* in series with the first inductor 214 to define the resonance tank circuit 212. When the signal indicative of the control signal indicates that the control signal is in an OFF state, and hence when the frequency of the modulated signal is the first (lower) frequency, the first capacitor 216*a* is connected to the first inductor 214. When the signal indicative of the control signal indicates that the control signal is in an ON state, and hence when the frequency of the modulated signal is the second (higher) frequency, the second capacitor is instead connected to the first inductor 214. The second capacitor has a lower capacitance than the first capacitor, such that the capacitance in the resonance tank circuit 212 is reduced when the control signal is in an ON state (and the frequency of the modulated signal is higher).

For both alternatives of FIGS. 3 and 4, in the case that the modulated signal is the signal indicative of the control signal, the state of the control signal can be determined by the resonance tank control switch 230 by detecting the frequency of the modulated signal. In the case that the control signal itself is the signal indicative of the control signal, the state of the control signal can be immediately determined by the resonance tank control switch 230 by detecting the value of the control signal (i.e., ON or OFF).

Although the present example embodiment has been described above in FIGS. 3 and 4 with the modulated signal corresponding to an OFF state of the control signal having a lower (first) frequency, in example embodiments where the modulated signal has a higher frequency when the control signal is in the OFF state, the resonance tank control switch 230 may be reversed, such that that the capacitance in the resonance tank circuit 212 is reduced when the control signal is in the OFF state.

In some example embodiments, the resonance tank control switch 230 may modify the capacitance in the resonance tank circuit 212 such that the resonant frequency of the resonance tank circuit 212 matches the frequency of modulated signal at any given time. Put another way, the resonance point of the tank circuit 212 is dynamically shifted to match the present frequency of the modulated signal, and therefore match the switching frequency of the first and second switches.

Specifically, the resonance tank circuit 212 is an LC circuit which has a particular resonant frequency. The resonant frequency of the tank circuit is proportional to the inverse of the square root of the total (effective) capacitance of the first and second capacitor 216*a*, 216*b*, and the inductance of the first inductor 214. Thus, when the control signal is in the OFF state and the modulated signal has the first frequency, the capacitance values of the capacitors connected into the resonant tank by the resonance tank control switch 230 may be chosen such that the resonance frequency of the resonance tank circuit matches the first frequency. Similarly, when the control signal is in the ON state and the modulated signal has the second frequency, the capacitance values of the capacitors connected into the resonant tank by the resonance tank control switch 230 may be chosen such that the resonance frequency of the resonance tank circuit matches the second frequency.

Matching the resonant frequency of the resonance tank circuit 212 to the frequency of the modulated control signal in each of the ON or OFF states is particularly beneficial, because the power (supply voltage) transfer though the isolated DC-DC converter 202 is left unchanged when the switching frequency presently being used by the switching module 206 matches the resonance frequency of the resonance tank circuit 212. If the resonance frequency of the resonance tank circuit 212 were to not match with the frequency of the modulated signal, the bipolar voltages +Vout and −Vout would change, which could lead to an insufficiency of the voltage supply to power switch 270. This is because the impedance through the isolated DC-DC converter 202 increases away resonance from the frequency, causing a corresponding voltage drop. Therefore, ensuring that the resonant frequency of the resonance tank circuit 212 always matches the frequency of the modulated signal prevents any insufficiency of the supply to power switch 270 when the signal and power are transferred through the same transformer.

Although the resonance tank control switch 230 is illustrated by a circuit diagram switch symbol in FIGS. 3 and 4, it is to be understood that various switching modules could be used. For example, the resonance tank control switch 230 may be a transistor in some example embodiments. The control signal may be input into the gate of the transistor as the signal indicative of the control signal in some example embodiments. In other example embodiments, the resonance tank control switch 230 may include a switch and a switch controller to control the switching based on the signal indicative of the control signal.

Further, alternative capacitor arrangements could be used instead of those shown in FIGS. 3 and 4. For example, in some example embodiments, a single variable capacitor may be used, with the capacitance of the variable capacitor modified based on the signal indicative the control signal. In other example embodiments, capacitors in series could be selectively removed by the resonance tank control switch 230, e.g., by providing a short circuit around a capacitor.

The isolated gate driver system 200 further includes a demodulator 232 in the secondary side. The demodulator 232 is coupled to the second inductor 218 in order to receive the signal induced in the second inductor 218 in the secondary side of the isolated DC-DC converter by the alternating signal in the first inductor 214. The demodulator 232 demodulates the signal induced in the second inductor 218 to recover the original control signal input into the modulator 228, i.e., the PWM signal. Specifically, in the case of the FSK modulation used in the present example embodiment, the demodulator 232 can detect the frequency of the signal induced in the second inductor 218 and use this to determine the ON or OFF state of the control signal, and thus demodulate the signal. The demodulated control signal is output by the demodulator 232 to the gate driver circuit 250, as will be discussed in more detail below.

The gate driver circuit 250 is connected to the secondary side of the isolated DC-DC converter 202, and, as mentioned, receives both the bipolar voltage output by the output interface 226 of the isolated DC-DC converter 202 and the demodulated control signal output by the demodulator 232. The gate driver circuit 250 outputs a driving signal to a power switch 270 driven by the isolated gate driver system 200, based on the bipolar voltage and the demodulated control signal.

The bipolar voltage acts as the power supply for the gate driver circuit 250. In this way, the power for the gate driver circuit 250 is isolated via the transformer 220 of the isolated DC-DC converter 202. Further, the demodulated control signal provides the switching signal for power switch 270 driven by the gate driver circuit 250. In this way, the control signal for the gate driver circuit 250 is also isolated via the transformer 220 of the isolated DC-DC converter 202. Thus, in the isolated gate driver system 200 of FIGS. 2 to 5, isolation for both power transmission and signal transmission is integrated into a single module, the resonance tank transformer 220.

FIG. 5 shows one example of the internal circuitry of the gate driver circuit 250, including first and second transistors 252,254 connected between the positive and negative voltage outputs of the bipolar voltage, as well as a capacitor 256 connected in parallel to the first and second transistors 252, 254. An input resistor 258 connects the demodulated control signal to the gates of the first and second transistors 252, 254, and an output resistor 260 connects the output of the gate driver circuit 250 to the power switch 270 driven by the isolated gate driver system 200. As would be understood by the skilled person, various alternative gate driver circuit arrangements may be used, and the present invention is not limited to the arrangement shown in FIG. 5.

The power switch 270 receives the driving signal output by the gate driver circuit 250 at a gate of the power switch 270, with the source terminal of the power switch connected to 0V relative to the bipolar voltage +Vout, −Vout. The power switch 270 may be any type of power transistor, such as a MOSFET, an IGBT, a SiC MOSFET, a GaN HEMT, or the like.

As discussed, the isolated gate driver system 200 of the first example embodiment enables both signal and power transmission to be isolated via the same transformer 220, thus allowing a more compact system. Further, the resonance topology of the resonant tank circuit 212 provides good load regulation properties.

An FSK modulation scheme is used in the first example embodiment of FIGS. 2 to 5. However, as mentioned, various other modulation schemes may be used. A second example embodiment of the present invention that uses an edge detection modulation scheme will now be described in relation to FIGS. 6 to 8.

Figure 6:
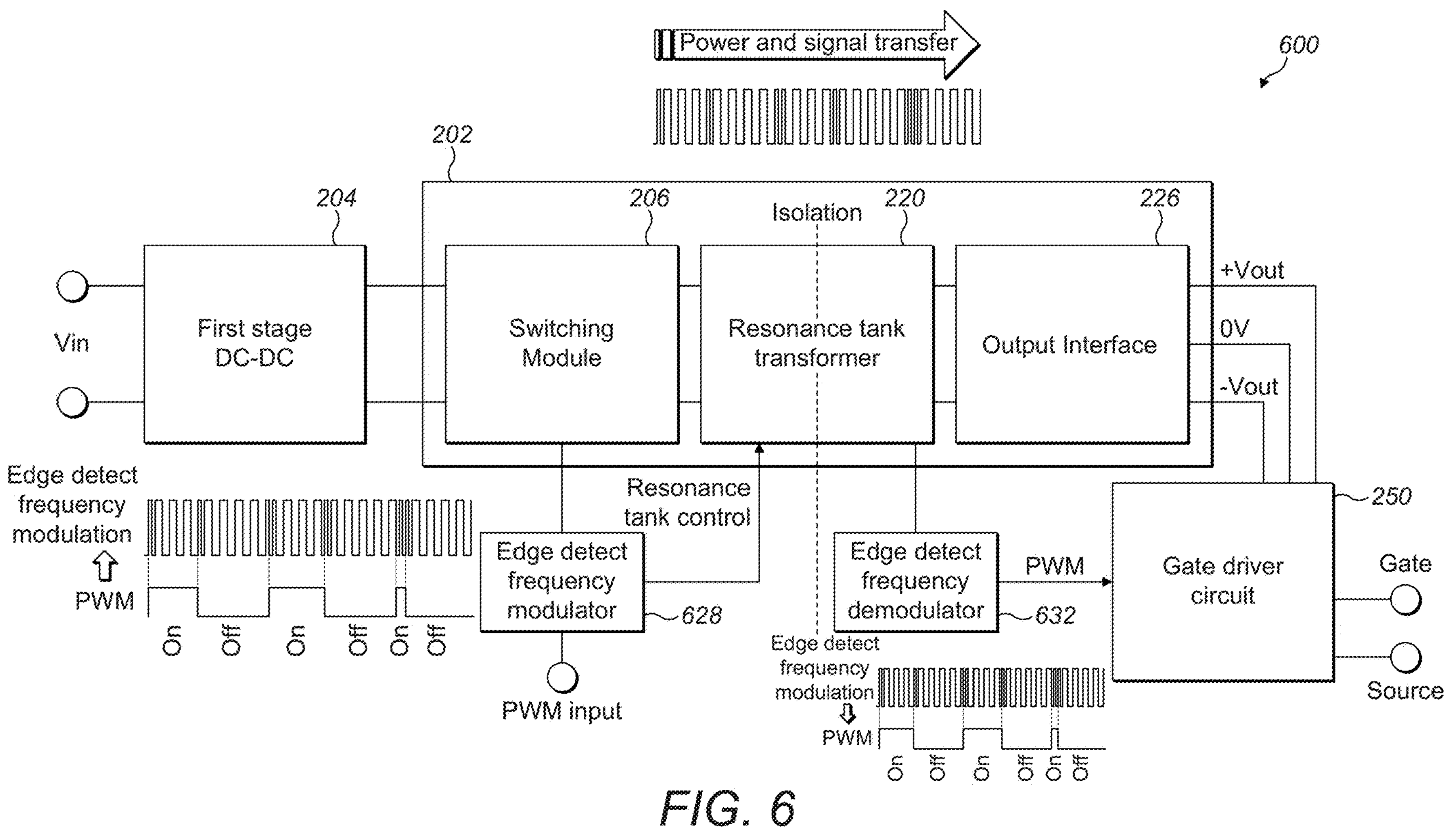
FIG. 6 shows an isolated gate driver system according to a second example embodiment of the driver invention.
Figure 7:
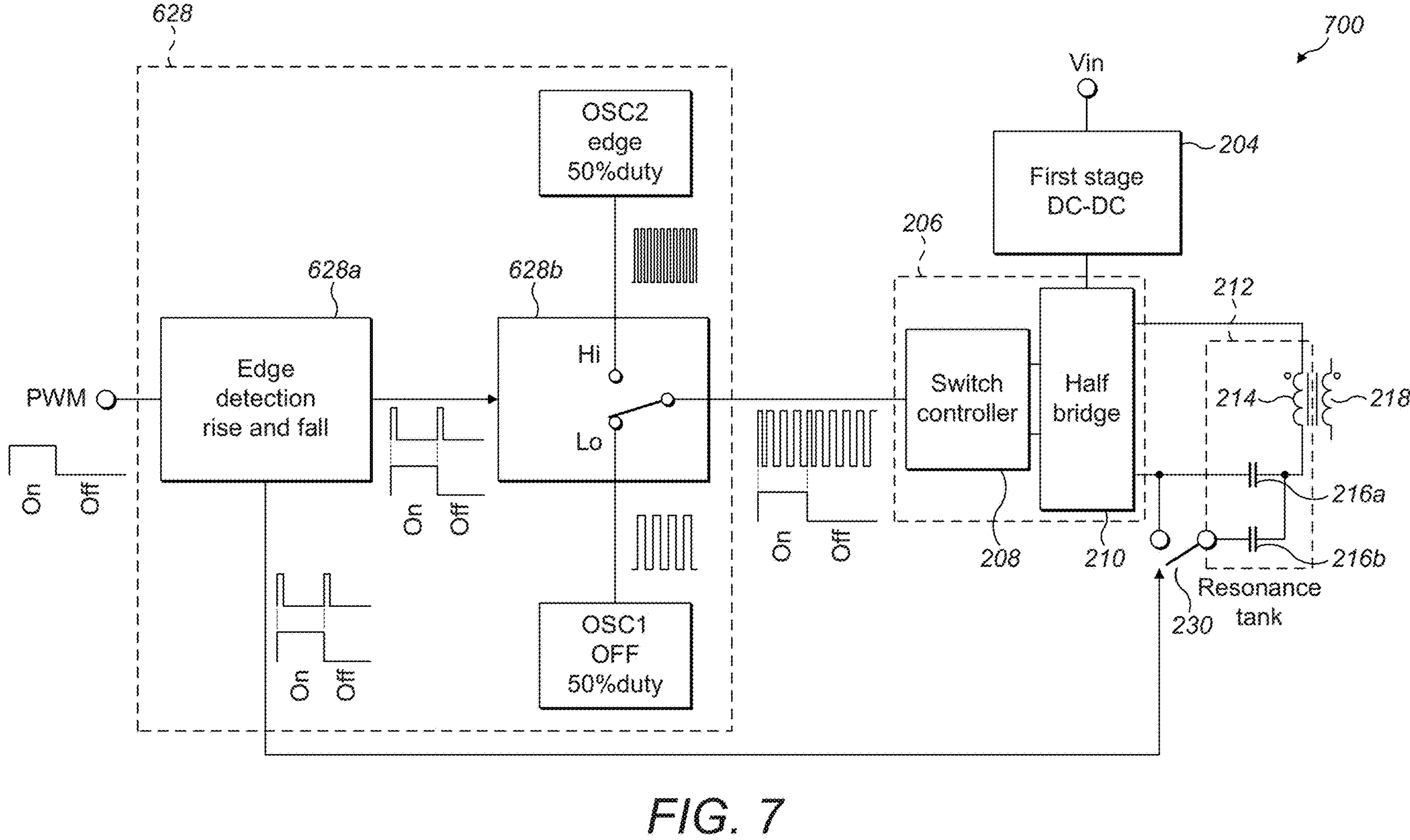
FIG. 7 shows a configuration of a primary side of the isolated gate driver system according to FIG. 6.
Figure 8:
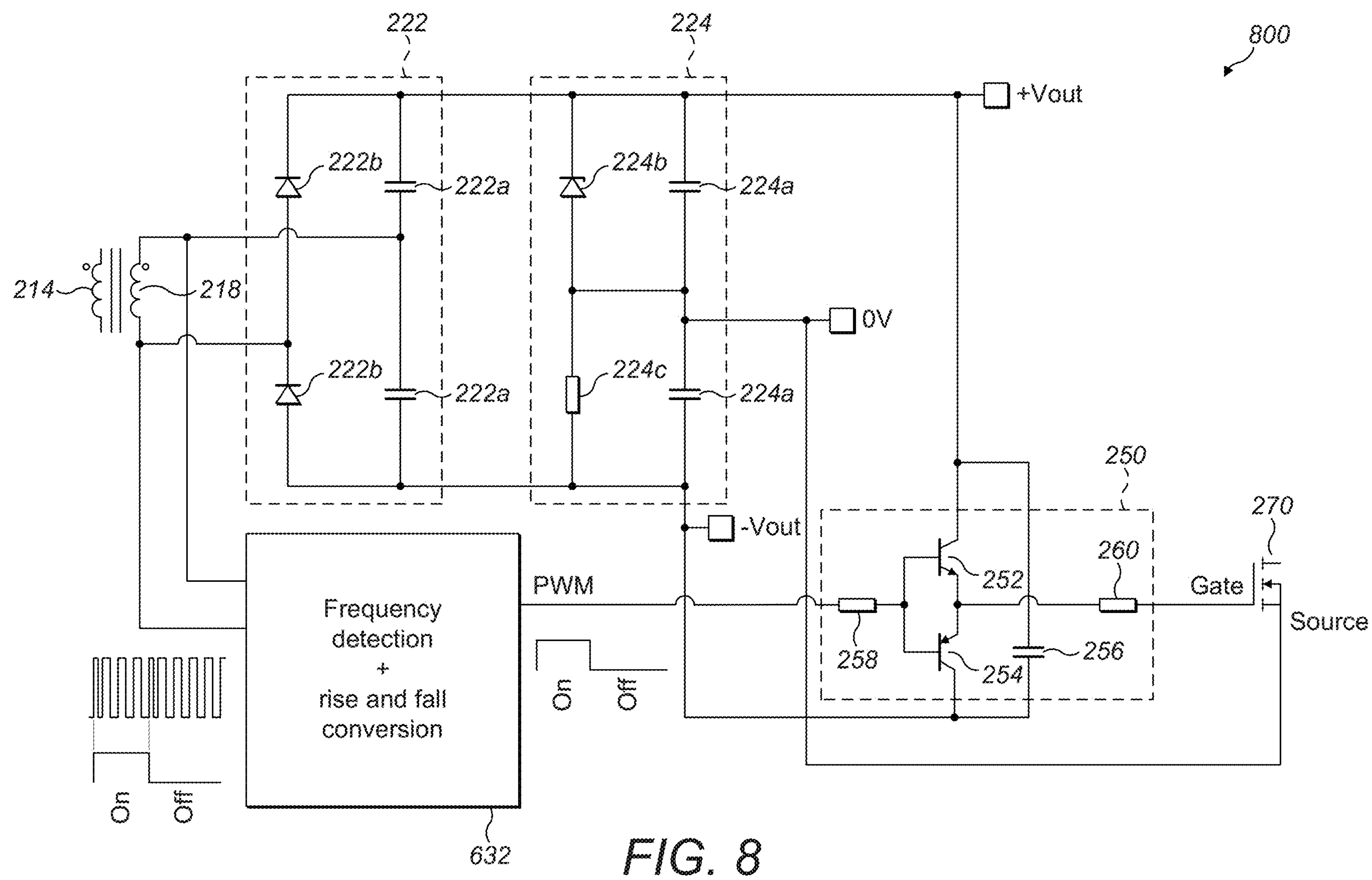
FIG. 8 shows a configuration of a secondary side of the isolated gate driver system according to FIG. 6.

FIG. 6 shows an isolated gate driver system 600 according to the second example embodiment of the present invention. FIG. 7 shows a primary side 700 of the isolated gate driver system 600 according to FIG. 6. FIG. 8 shows a secondary side 500 of the isolated gate driver system 600 according to FIG. 6.

The isolated gate driver system 600, and primary and secondary sides 700, 800 are largely the same as the isolated gate driver system 200 of the first example embodiment shown in FIGS. 2 to 5, and a repeat description will therefore be omitted. The isolated gate driver system 600 of the second example embodiment differs in that the primary side 700 includes an alternative modulator 628, and the secondary side 800 includes an alternative demodulator 632.

In the isolated gate driver system 600 of the second example embodiment, an edge detection modulation scheme is used instead of FSK modulation. As shown in FIG. 7, the modulator 628 of the second example embodiment includes an edge detector **628*a* that receives the control signal, e.g., a PWM signal, and detects a change (i.e., edge) between an ON state and an OFF state in the control signal. The edge detector 628*a* detects both the rising edge between an OFF state and an ON state, and the falling edge between an ON state and an OFF state. The modulator 628** then generates a modulated signal having a first frequency corresponding to when an edge is not detected, and having a second frequency corresponding to when an edge is detected.

Specifically, the edge detector **628*a* outputs, based on the control signal, an edge signal indicating when an edge is detected and when an edge is not detected. In some example embodiments, the edge signal may be a square wave signal with a short ON pulse corresponding to each edge, both rising or falling, and an OFF state when no edge is detected. The edge signal is used to control a switch 628*b* in the modulator 628 that switches between a carrier signal with a first frequency (OSC1) and an approximately 50% duty cycle when no edge is detected in the control signal, i.e., the edge signal is in an OFF state, and a carrier signal with a second frequency (OSC2**) and an approximately 50% duty cycle when an edge is detected in the control signal, i.e., the edge signal is in an ON state. The modulated signal therefore includes a small pulse of the second frequency carrier signal whenever a rising or falling edge is detected. Otherwise, the modulated signal has the first frequency.

As before, in the present example embodiment, the second frequency is higher than the first frequency, however the second frequency may also be lower than the first frequency in some example embodiments.

The modulated signal is transferred from the primary side to the secondary side of the isolated DC-DC converter 202 in the same way as in the first example embodiment. In particular, the modulated signal is transferred to the switch controller 208 to control switching of the half bridge 210 (or other isolated DC-DC converter topology) in the switching module 206. This generates an alternating signal in the first inductor 214 of the resonance tank transformer 220 which transfers the modulated signal through the to the second inductor 218 via induction.

Similarly to the first example embodiment, the resonance tank circuit 212 includes a resonance tank control switch 230 that modifies the effective capacitance in the resonance tank circuit 212 based on a signal indicative of the control signal received from the modulator 628. In second example embodiment, the signal indicative of the control signal may again be the modulated signal or the control signal itself. Further, in some example embodiments, the signal indicative of the control signal may be the edge signal, as shown in FIG. 7.

Based on the signal indicative of the control signal, the resonance tank control switch 230 switches the capacitance of the resonance tank circuit 212 such that the capacitance has a first capacitance value when the modulated signal has the first frequency, and the capacitance has a second capacitance value when the modulated signal has the second frequency. In other words, each frequency of the modulated signal has its own resonant tank capacitor configuration.

Similarly to the first example embodiment, in the second example embodiment the resonance tank control switch 230 may switch the capacitance of the resonance tank circuit 212 such that the resonance: frequency of the resonance tank circuit 212 always matches the frequency of the modulated signal. For example, in the example embodiment shown in FIG. 7, where the signal indicative of the control signal is the edge signal, whenever the edge signal has an OFF value the capacitance of the resonance tank circuit 212 may be set by the resonance tank control switch 230 to a first value that results in a resonant frequency equal to the first frequency, and whenever the edge signal has an ON value the capacitance of the resonance tank circuit 212 may be set by the resonance tank control switch 230 to a second value that results in a resonant frequency equal to the second frequency. This prevents any insufficiency of the power supply to the power switch 270 from occurring.

In the present example embodiment, as shown in FIG. 7, a resonance tank control switch 230 and first and second capacitor 216*a*, 216*b* arrangement similar to that of FIG. 3 is used. However, the other alternatives discussed previously for the first example embodiment may also be used in the second example embodiment. For example, the second employment may use a resonance tank control switch 230 configuration as shown in FIG. 4, or a variable capacitor in the resonant tank 212 to modify the capacitance.

As mentioned, the isolated gate driver system 600 of the second example embodiment further includes an alternative demodulator 632. The demodulator operates in a similar way to the first example embodiment, namely, the demodulator 632 is coupled to the second inductor 218 to receive the signal induced in the secondary side of the isolated DC-DC converter 202. The demodulator 632 demodulates the signal induced in the second inductor 218 to recover the original control signal input into the modulator 628, e.g., the PWM signal.

For the edge detection modulation scheme used in the present example embodiment, the demodulator 232 detects the frequency of the signal induced in the second inductor 218 and uses this to determine the locations of the edges in the control signal. A demodulated version of the control signal can then be inferred, for example, by knowing that the first edge will always be a rising edge, only a falling edge can follow a rising edge, and only a rising edge can follow a falling edge. The demodulated control signal is then output by the demodulator 232 to the gate driver circuit 250, as described in the first example embodiment.

Each of the alternatives and modifications described above for the first example embodiment may be applied analogously to the second example embodiment shown in FIGS. 6 to 8. For example, the specific circuitry arrangements of the rectifier circuit 222, voltage dividing circuit 224, and gate driver circuit 250 are shown in FIG. 8 for one specific example embodiment of the present invention. The alternatives described for the first example embodiment may also be used in the second example embodiment.

The edge detection modulation of the second example embodiment provides additional advantages over the FSK modulation of the first example embodiment. In particular, when using FSK modulation, the frequency of the modulated signal is continuously high when the control signal is in the ON state. Edge detection modulation, on the other hand, has the advantage that a high frequency only needs to be used in a short pulse when an edge is detected, which results in the modulated signal being at a high frequency for a much smaller amount of time compared to FSK modulation. This leads to improvements in the efficiency, particularly for control signals with long ON states, as a lower frequency modulated signal requires less energy.

Figure 1:
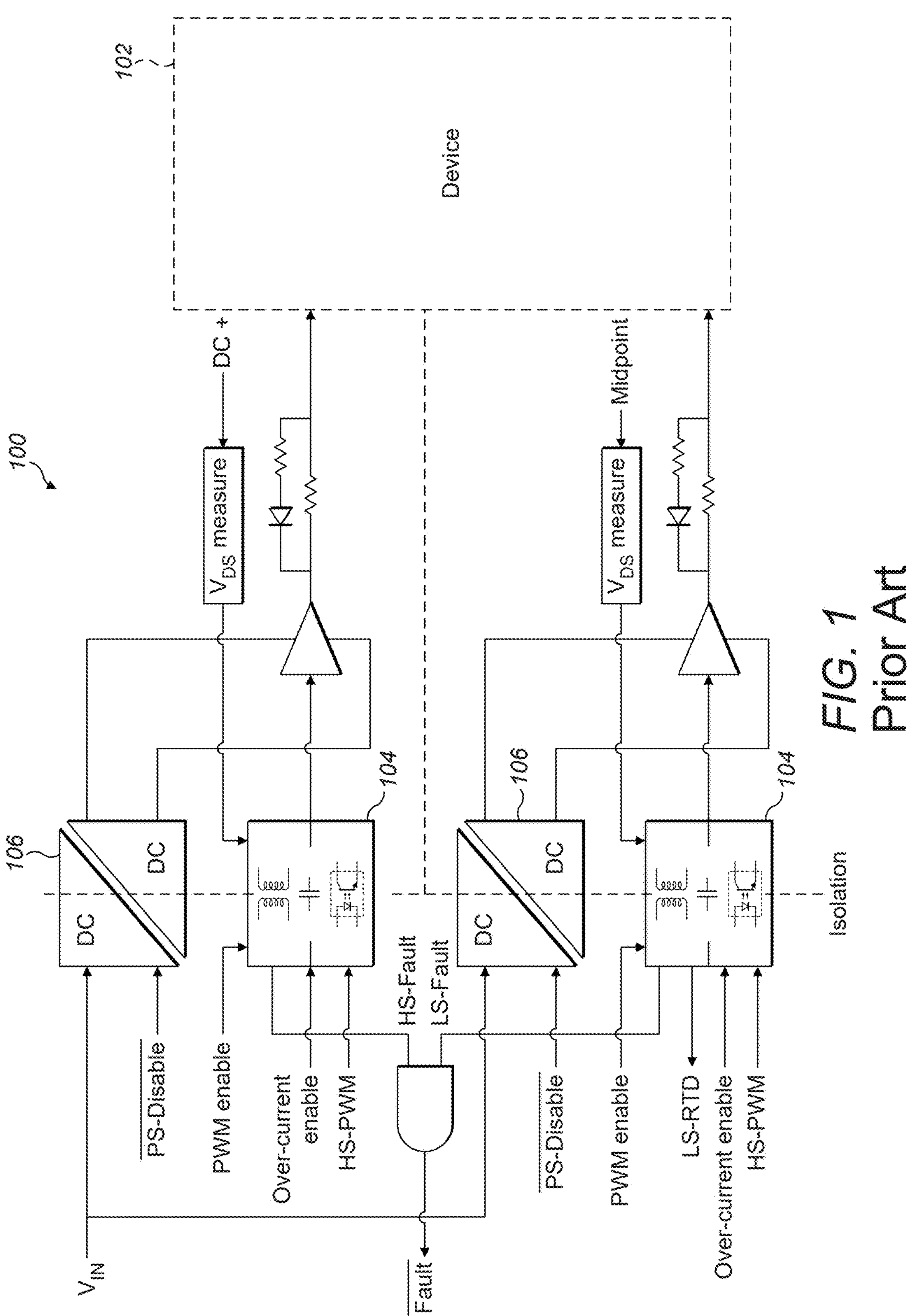
FIG. 1 shows an exemplary isolated gate driver system of the prior art.

FIGS. 2 and 6 illustrating the first and second example embodiments each show the isolated gate driver system 200, 600 driving a single power switch 270. However, in some example embodiments, multiple isolated gate driver systems 200,600 may be used in combination to drive a single power switch, as shown in the gate driver system 100 of FIG. 1, for example. In particular, some power switches, such as silicon carbide MOSFETs, can require a negative voltage to ensure that they are switched off. Therefore, in some example embodiments, two isolated gate driver systems 200, 600 as shown in FIGS. 2 and/or 6 may be used in combination, to provide high side and low side driving signals to the power switch 270.

A method of generating a driving signal for a transistor in an example embodiment of the present invention will now be described in relation to FIG. 9. The method may be performed by the isolated gate driver systems of any of the previous example embodiments to generate a driving signal for the power switch 270.

In step 902, the supply voltage is input into the primary side of the isolated DC-DC converter 202.

In step 904, the modulated signal is generated by the modulator 228, 628 based on the control signal, and is output to the switch controller 208 to control switching of the first and second switches in the primary side of the isolated DC-DC converter 202.

In step 906, the modulator 228, 628 sends to the resonance tank control switch 230 the signal indicative of the control signal.

In step 908, the resonance tank control switch 230 modifies the capacitance in the resonance tank circuit 212 based on the signal indicative of the control signal.

In step 910, the demodulator 232, 632 receives the signal induced in the secondary side of the isolated DC-DC converter 202.

In step 912 the demodulator 232, 632 demodulates the received signal to recover the control signal.

In step 914, the gate driver circuit 250 receives the demodulated control signal from the demodulator 232, 632.

In step 916, the gate driver circuit 250 outputs the driving signal for the power switch 270 based on the demodulated control signal from the demodulator 232, 632 and the bipolar voltage output by the output interface 226 of the secondary side of the isolated DC-DC converter 202.

Figure 9:
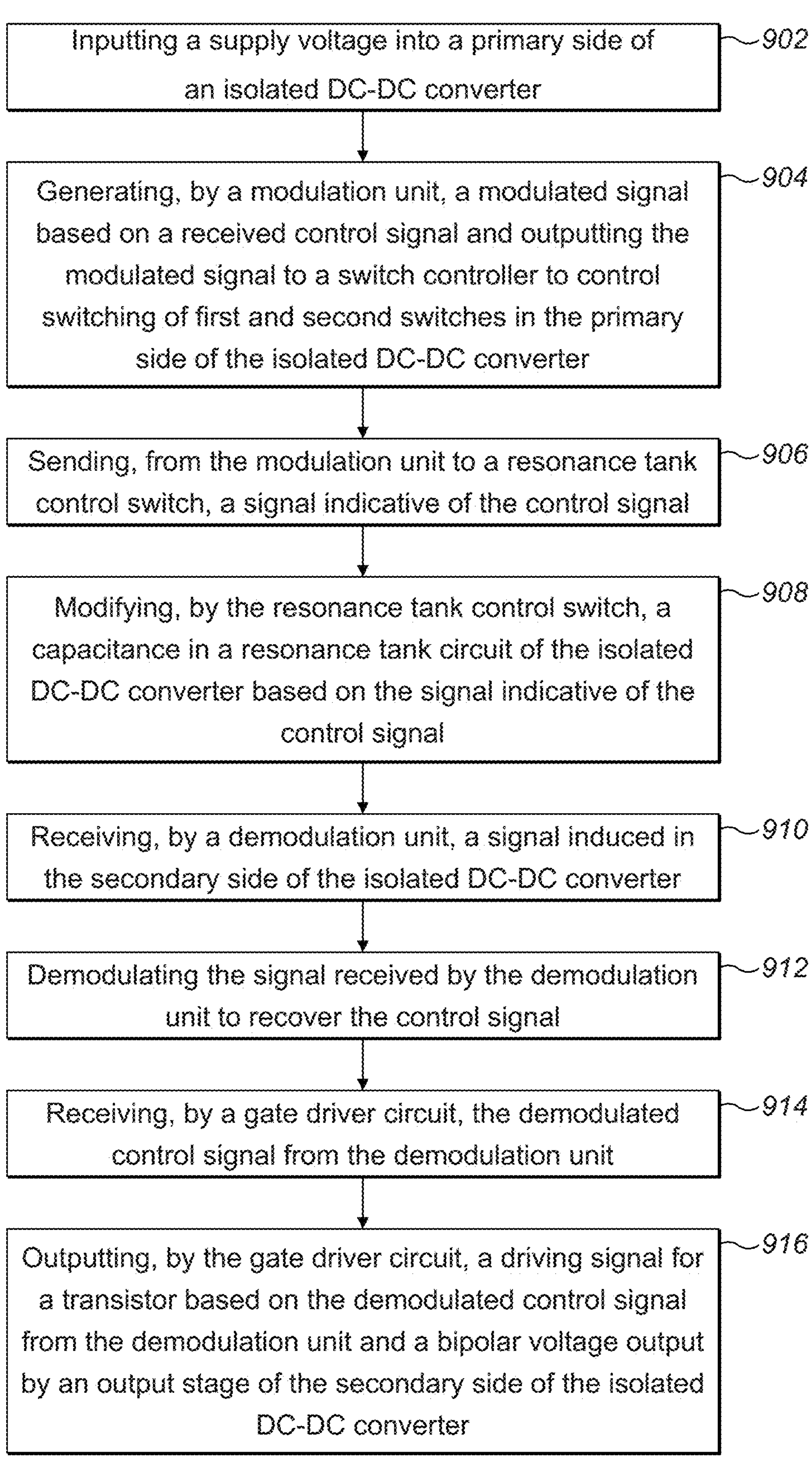
FIG. 9 shows a method of generating a driving signal for a transistor according to an example embodiment of the present invention.

The method of FIG. 9 allows the isolation for both the power and signal transmission to be integrated into one module, i.e., provided by the same transformer.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An isolated gate driver system comprising:

an isolated DC-DC converter including a primary side and a secondary side, the primary side including an input to receive a supply voltage, a switch controller, first and second switches, and a resonance tank circuit including one or more capacitors and a first inductor, and the secondary side including a second inductor coupled to the first inductor to define a transformer, and an output interface to output a bipolar voltage;

a modulator to receive a control signal, generate a modulated signal based on the control signal, and output the modulated signal to the switch controller to control switching of the first and second switches in the primary side of the isolated DC-DC converter;

a resonance tank control switch to receive a signal indicative of the control signal from the modulator and modify a capacitance in the resonance tank circuit based on the signal indicative of the control signal;

a demodulator to receive a signal induced in the secondary side of the isolated DC-DC converter, demodulate the signal to recover the control signal, and output a demodulated control signal; and a gate driver circuit to receive the demodulated control signal from the demodulator and receive the bipolar voltage output by the isolated DC-DC converter and to output a driving signal for a transistor based on the demodulated control signal and the bipolar voltage.

2. The isolated gate driver system according to claim 1, wherein the control signal is a pulse-width modulation signal or a pulse-frequency modulation signal.

3. The isolated gate driver system according to claim 1, wherein the modulated signal has a first frequency corresponding to an OFF state of the control signal and has a second frequency corresponding to an ON state of the control signal.

4. The isolated gate driver system according to claim 3, wherein the modulator is operable to generate the modulated signal using frequency-shift keying.

5. The isolated gate driver system according to claim 3, wherein the signal indicative of the control signal is the modulated signal; or the signal indicative of the control signal is the control signal itself.

6. The isolated gate driver system according to claim 3, wherein the resonance tank control switch is operable to set the capacitance in the resonance tank circuit to a first capacitance value when the modulated signal has the first frequency, and the resonance tank control switch is operable to set the capacitance in the resonance tank circuit to a second capacitance value when the modulated signal has the second frequency.

7. The isolated gate driver system according to claim 6, wherein a resonance frequency of the resonance tank circuit with the first capacitance value is equal to the first frequency and a resonance frequency of the resonance tank circuit with the second capacitance value is equal to the second frequency.

8. The isolated gate driver system according to claim 1, wherein the modulator includes an edge detector to detect a change between an ON state and an OFF state in the control signal; and the modulated signal has a first frequency corresponding to when an edge is not detected and has a second frequency corresponding to when the edge is detected.

9. The isolated gate driver system according to claim 8, wherein the edge detector is operable to output an edge signal indicating when an edge is detected and when the edge is not detected; and the signal indicative of the control signal is the edge signal.

10. The isolated gate driver system according to claim 1, wherein the modulated signal has a duty cycle equal to or approximately equal to 50%.

11. The isolated gate driver system according to claim 1, wherein the resonant tank circuit includes a first capacitor coupled to the first inductor, and the resonance tank control switch is operable to modify the capacitance in the resonance tank circuit by connecting a second capacitor in parallel to the first capacitor.

12. The isolated gate driver system according to claim 1, wherein the resonance tank circuit includes a first capacitor and a second capacitor, and the resonance tank control switch is operable to modify the capacitance in the resonance tank circuit by selectively switching between the first capacitor and the second capacitor.

13. The isolated gate driver system according to claim 1, wherein the demodulator is coupled to the second inductor to receive the signal induced in the secondary side.

14. The isolated gate driver system according to claim 1, wherein the first and second switches are arranged as a half bridge.

15. The isolated gate driver system according to claim 1, wherein the isolated DC-DC converter is a resonant half-bridge converter.

16. The isolated gate driver system according to claim 1, further comprising a first stage DC-DC converter to:

receive an input voltage;

generate an output voltage from the input voltage; and output the output voltage as the supply voltage for the isolated DC-DC converter.

17. The isolated gate driver system according to claim 16, wherein the first stage DC-DC converter is a non-isolated DC-DC converter or a buck converter.

18. The isolated gate driver system according to claim 1, wherein the output interface includes a rectifier circuit coupled to the second inductor.

19. The isolated gate driver system according to claim 18, wherein the rectifier circuit is a voltage doubler.

20. The isolated gate driver system according to claim 18, wherein the output interface includes a filter circuit to smooth the output voltage of the rectifier circuit.

* * * * *